United States Patent
Nishitani (10) Patent No.: US 9,439,262 B2
(45) Date of Patent: Sep. 6, 2016

(54) LED DRIVE DEVICE

(71) Applicant: DENSO CORPORATION, Kariya, Aichi-pref. (JP)

(72) Inventor: Daisuke Nishitani, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/777,792

(22) PCT Filed: Apr. 9, 2014

(86) PCT No.: PCT/JP2014/002022
§ 371 (c)(1),
(2) Date: Sep. 17, 2015

(87) PCT Pub. No.: WO2014/167847
PCT Pub. Date: Oct. 16, 2014

(65) Prior Publication Data
US 2016/0143098 A1    May 19, 2016

(30) Foreign Application Priority Data

Apr. 12, 2013   (JP) .................................. 2013-84349

(51) Int. Cl.
H02H 3/16     (2006.01)
H05B 33/08    (2006.01)
H02H 1/00     (2006.01)

(52) U.S. Cl.
CPC ............ H05B 33/089 (2013.01); H02H 1/003 (2013.01); H02H 3/16 (2013.01); H02H 3/167 (2013.01); H05B 33/0845 (2013.01)

(58) Field of Classification Search
CPC .......................... H05B 33/0845; H05B 33/089
See application file for complete search history.

(56) References Cited

U.S. PATENT DOCUMENTS

2006/0267514 A1    11/2006   Xu
2008/0238344 A1    10/2008   Isobe et al.
(Continued)

FOREIGN PATENT DOCUMENTS

EP    2 200 406 A2    6/2010
JP    2009-099894 A   5/2009
(Continued)

OTHER PUBLICATIONS

International Search Report of the International Searching Authority mailed May 13, 2014 for the corresponding international application No. PCT/JP2014/002022 (and English translation).
(Continued)

*Primary Examiner* — Jason M Crawford
*Assistant Examiner* — Kurtis R Bahr
(74) *Attorney, Agent, or Firm* — Posz Law Group, PLC (57) ABSTRACT

An LED drive device that drives and lights on an LED includes: a power conversion device that converts a voltage of a first power supply, and supplies the voltage to the LED; a second power supply having a voltage lower than a threshold voltage of the LED; a current generation unit that generates current using the voltage of the second power supply, and supplies generated current to an anode of the LED; and a ground-fault detection unit that determines that a ground fault does not occur at the anode of the LED when current does not flow from the current generation unit, and determines that the ground fault occurs at the anode of the LED when current flows from the current generation unit.

9 Claims, 8 Drawing Sheets

(56) References Cited

U.S. PATENT DOCUMENTS

| | | |
|---|---|---|
| 2010/0270926 A1 | 10/2010 | Matsui et al. |
| 2011/0109241 A1 | 5/2011 | Kitamura |
| 2012/0313537 A1* | 12/2012 | Gruber ............... H05B 33/0815 315/188 |
| 2015/0381030 A1* | 12/2015 | Endo ........................ H02H 9/08 363/50 |

FOREIGN PATENT DOCUMENTS

| | | |
|---|---|---|
| JP | 2009-270999 A | 11/2009 |
| JP | 2010-147220 A | 7/2010 |
| JP | 2011-162008 A | 8/2011 |
| JP | 2011-255729 A | 12/2011 |
| JP | 2012-150955 A | 8/2012 |
| JP | 2012-153271 A | 8/2012 |

OTHER PUBLICATIONS

Written Opinion of the International Searching Authority mailed May 13, 2014 for the corresponding international application No. PCT/JP2014/002022 (and English translation).

* cited by examiner

LED DRIVE DEVICE

CROSS REFERENCE TO RELATED APPLICATIONS

This application is a U.S. national stage of International Application No. PCT/JP2014/002022 filed on Apr. 9, 2014 and is based on Japanese Patent Application No. 2013-84349 filed on Apr. 12, 2013, the disclosures of which are incorporated herein by reference.

TECHNICAL FIELD

The present disclosure relates to an LED drive device that detects a ground fault on an anode side of an LED.

BACKGROUND ART

A light emitting device is disclosed in patent literature 1. The light emitting device has five LEDs disposed between output terminals of a power conversion device. Two LEDs (first LED and second LED) as a detection target and the other LEDs (third LED through fifth LED) are connected via a connection point. The power conversion device means a DC-to-DC converter 12 in patent literature 1 and LED stands for a light emitting diode.

A resistor is connected across the two LEDs as the detection target. In the light emitting device, both ends of the resistor are a detection target region which is connected to an anode electrode of the first LED and a cathode electrode of the second LED, and one end of the resistor is connected to a ground fault detection circuit via the connection point. When a ground fault occurs in the detection target region, a voltage at the connection point drops to ground potential. Hence, by detecting such a variance of the voltage using the ground-fault detection circuit, the light emitting device is capable of detecting a ground fault in the detection target region connected to the output terminal or the connection point.

The light emitting device, however, has a problem that when a ground fault is occurring at the anode of the LED, the light emitting device is incapable of detecting the ground fault before the DC-to-DC converter is activated. In other words, the light emitting device has a problem that the light emitting device is incapable of detecting a ground fault unless the DC-to-DC converter is activated.

PRIOR ART LITERATURES

Patent Literature

Patent Literature 1: JP-2008-251227 A

SUMMARY OF INVENTION

It is an object of the present disclosure to provide an LED drive device for detecting a ground fault at an anode of an LED without having to activate a power conversion device.

According to an aspect of the present disclosure, an LED drive device that drives and lights on an LED (100) having an anode connected to a power-supply line and a cathode connected to a ground includes: a power conversion device (10) that converts a voltage of a first power supply (V10), and supplies the voltage to the LED; a second power supply (V20) having a voltage lower than a threshold voltage, at which current starts flowing through the LED; a current generation unit (T20, T21, R20, R21) that generates current using the voltage of the second power supply, and supplies generated current to an anode of the LED; and a ground-fault detection unit (40, T40, T41, R42 through R44) that determines that a ground fault does not occur at the anode of the LED when current does not flow from the current generation unit, and determines that the ground fault occurs at the anode of the LED when current flows from the current generation unit.

In the LED drive device configured as above, the ground-fault detection unit can assume that a ground fault is not occurring at the anode of the LED when a current from the current generation portion is not flowing. On the other hand, the ground-fault detection unit can assume that a ground-fault is occurring at the anode of the LED when a current from the current generation portion is flowing. The LED drive device is thus capable of detecting whether a ground fault is occurring at the anode of the LED even before the power conversion device is activated.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
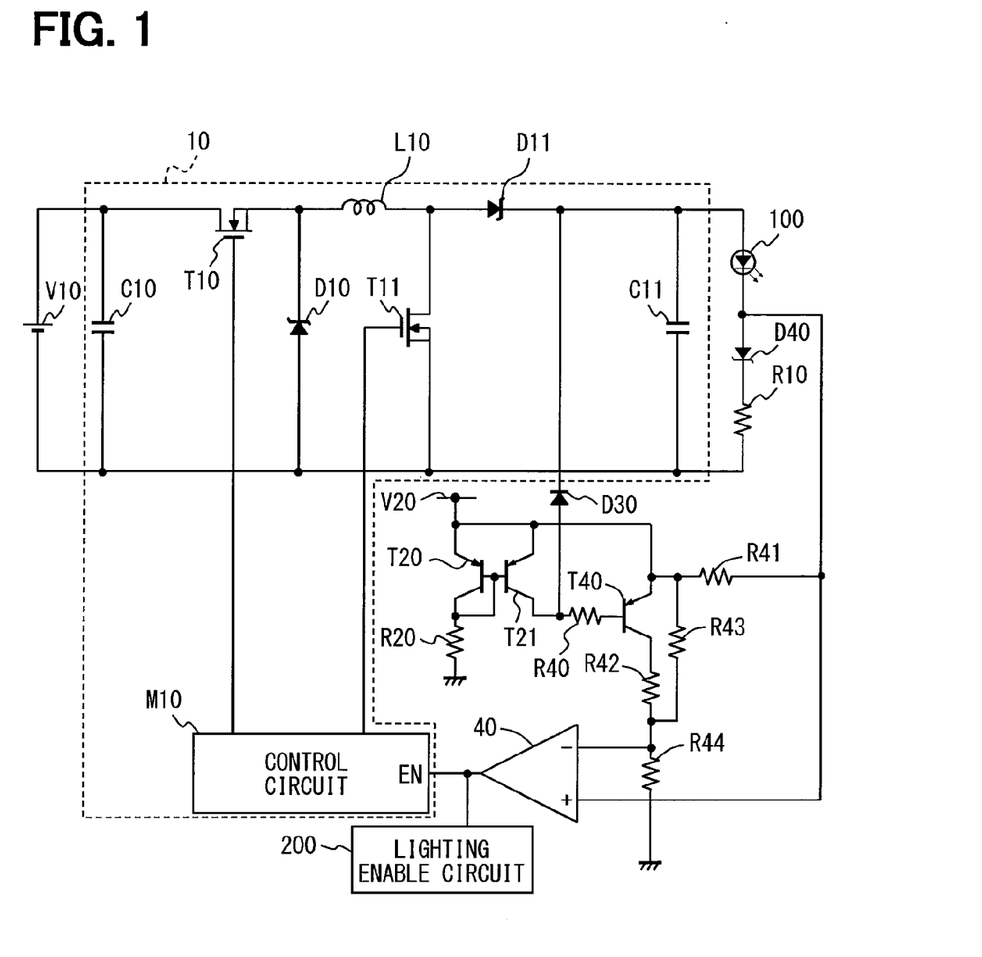
FIG. 1 a circuit diagram schematically showing a configuration of an LED drive device according to an embodiment.

Hereinafter, an embodiment of the present disclosure will be described according to the drawings. An LED drive device of the present embodiment drives lighting of an LED 100 connected, as shown in FIG. 1, to a power-supply line at an anode and connected to the ground at a cathode. The LED drive device is chiefly formed of a DC-to-DC converter 10, a ground-fault detection power supply V20, a current mirror circuit, a ground-fault detection portion, and so on. Hereinafter, the DC-to-DC converter 10 is occasionally referred to also simply as the converter 10.

The LED drive device of the present embodiment adopts a case where the LED drive device drives the single LED 100. It should be appreciated, however, that the present disclosure is not limited to the adopted case. The LED drive device may drive multiple LEDs. In addition, multiple LEDs driven by the LED drive device may be connected in series or in parallel.

The converter 10 corresponds to a power conversion device and supplies the LED 100 with a voltage of a battery V10 (first power supply) after voltage conversion. The converter 10 includes an input smoothing capacitor C10, an output smoothing capacitor C11, a first rectifier diode D10, a second rectifier diode D11, a choke coil L10, a high-side switch T10, and a low-side switch T11. The converter 10 further includes a control circuit M10 that controls the high-side switch T10 and the low-side switch T11. In the present embodiment, Schottky-barrier diodes are adopted as the first rectifier diode D10 and the second rectifier diode D11. The output smoothing capacitor C11 corresponds to a smoothing capacitor on an output side.

As is shown in FIG. 1, a current detection resistor (shunt resistor) R10 is provided between the cathode of the LED 100 and the ground. Further, as is shown in FIG. 1, a diode D40 is provided between the cathode of the LED 100 and the current detection resistor R10. The diode D40 is a diode used to generate a constant voltage, and an anode is connected to the cathode of the LED 100 while a cathode is connected to the current detection resistor R10. In the present embodiment, a Schottky-barrier diode is adopted as the diode D40.

Hence, a step-up and step-down DC-to-DC converter, which is used in the related art, is adopted as the converter 10 in the present embodiment. Also, the converter 10 is provided with the current detection resistor R10 on the low side as described above. The converter 10 can be therefore referred to as a DC-to-DC converter of a low-side current detection type. It should be appreciated, however, that the power conversion device of the present disclosure is not limited to the step-up and step-down DC-to-DC converter. Because the converter 10 is used in the related art, a detailed description of an operation is omitted herein.

The choke coil L10 can be referred to also as a switching inductor. MOSFETs are adopted as the high-side switch T10 and the low-side switch T11. A MOSFET may be used as a substitute for each of the first rectifier diode D10 and the second rectifier diode D11.

The ground-fault detection power supply V20, which corresponds to a second power supply, is as a power supply that passes a current used to detect a ground fault at the anode of the LED 100. The ground-fault detection power supply V20 is a power supply of a voltage lower than a threshold voltage Vth at which a current starts flowing through the LED 100. That is to say, the ground-fault detection power supply V20 is a power supply of a voltage low enough for a current not to flow through the LED 100. In other words, it can be said that the second power supply V20 is a voltage source less than the threshold voltage Vth.

The current mirror circuit corresponds to a current generation portion. The current mirror circuit is connected to the power-supply line of the converter 10 and configured to generate a current using the voltage from the ground-fault detection power supply V20. Also, the current mirror circuit is capable of supplying the generated current to the anode side of the LED 100. In other words, the current mirror circuit generates a current to be supplied to the anode of the LED 100 using the ground-fault detection power supply V20 which is a power supply different from the battery V10. The ground-fault detection power supply V20 may generate a voltage from the battery V10 using a power-supply IC.

More specifically, as is shown in FIG. 1, the current mirror circuit includes a first transistor T20, a second transistor T21, and a resistor R20. The current mirror circuit is capable of charging the output smoothing capacitor C11, which is provided in parallel with the LED 100, by passing the generated current through the output smoothing capacitor C11.

As is shown in FIG. 1, the current mirror circuit is connected to the power-supply line of the converter 10 via a diode D30. The diode D30 is connected to the current mirror circuit at an anode and connected to the power-supply line of the converter 10 at a cathode. The diode D30 is a rectifier diode that prevents a current from flowing in while the converter 10 is in operation.

The ground-fault detection portion is a circuit that detects whether a ground fault is occurring at the anode of the LED 100. The ground-fault detection portion is a circuit configured to assume that a ground fault is not occurring at the anode of the LED 100 when a current from the current mirror circuit is not flowing and assume that a ground fault is occurring at the anode of the LED 100 when a current from the current mirror circuit is flowing.

Further, the ground-fault detection portion in the present embodiment has a circuit configuration by which commands to enable an operation and stop an operation of the converter 10 are issued according to a result of ground-fault detection. It is preferable to adopt the circuit configuration by which commands to enable an operation and stop an operation of the converter 10 are issued as the ground-fault detection portion, because the converter 10 can be activated or stopped according to a result of ground-fault detection.

The ground-fault detection portion includes a comparator 40, a resistor R42, a resistor R43, a resistor R44, and a transistor T40. The comparator 40 has an inverting input terminal (−) to which a connection point of the resistor R44 and the resistor R43 and a connection point of the resistor R44 and the register R42 are connected, and a non-inverting input terminal (+) to which the anode of the diode D40 is connected. Hereinafter, the inverting input terminal means the inverting input terminal of the comparator 40 and the non-inverting input terminal means the non-inverting input terminal of the comparator 40.

The comparator 40 is capable of enabling an operation of the converter 10 when a voltage at the inverting input terminal is lower than a voltage at the non-inverting input terminal. Also, the comparator 40 is capable of stopping an operation of the converter 10 when a voltage at the inverting input terminal is higher than a voltage at the non-inverting input terminal. In other words, when a voltage at the inverting input terminal is higher than a voltage at the non-inverting input terminal, the comparator 40 sets an enable terminal of the control circuit M10 to ground potential. The converter 10 is thus changed to an inoperable state. The comparator 40 is an open collector. A voltage at the enable terminal of the control circuit M10 therefore rises to a high voltage (hereinafter, occasionally referred to also simply as HIGH) outputted from a lighting enable circuit 200 or drops to the ground potential when an output stage transistor of the comparator 40 switches ON. Hereinafter, the high voltage is occasionally referred to also simply as HIGH. The comparator 40 is used in the related art and the output stage transistor is omitted in the drawing.

In the present embodiment, the lighting enable circuit 200 is connected between an output terminal of the comparator 40 and the control circuit M10. When the lighting is ready, the lighting enable circuit 200 makes an attempt to set the enable terminal to HIGH independently of whether a ground fault is occurring at the anode of the LED 100.

On the contrary, the comparator 40, being an open collector, has high impedance when a ground fault is not occurring at the anode of the LED 100, because the output stage transistor of the comparator 40 stays OFF. Consequently, the result (output) of the lighting enable circuit 200 is the state of the enable terminal. On the other hand, in the event of a ground fault at the anode of the LED 100, the output stage transistor of the comparator 40 switches ON and the enable terminal is pulled to the ground potential. In the event of a ground fault at the anode of the LED 100, the enable terminal is pulled to the ground potential even when the lighting enable circuit 200 outputs HIGH in attempting to set the enable terminal to HIGH.

The resistor R42 through the resistor R44 and the transistor T40 correspond to a voltage setting circuit. The resistor R42 through the resistor R44 are resistors that set a voltage at the inverting input terminal. On the other hand, the transistor T40 is a switch transistor that changes a resistance ratio of the resistors that set a voltage at the inverting input terminal. That is to say, the resistor R42 through the resistor R44 and the transistor T40 set a voltage at the inverting input terminal of the comparator 40 in such a manner that a voltage at the inverting input terminal becomes lower than a voltage at the non-inverting input terminal when a current from the current mirror circuit is not flowing. On the other hand, the resistor R42 through the resistor R44 and the transistor T40 set a voltage at the inverting input terminal of the comparator 40 in such a manner that a voltage at the inverting input terminal becomes higher than a voltage at the non-inverting input terminal when a current from the current mirror circuit is flowing. In the manner as above, the resistor R42 through the resistor R44 and the transistor T40 set a voltage at the inverting input terminal of the comparator 40 by switching voltage-dividing resistors that determine a voltage at the inverting input terminal depending on whether a current from the current mirror circuit is flowing.

A resistor R40 is a resistor that sets a base current with which the transistor T40 switches ON. A resistor R41 is a resistor that sets a current to be passed through the diode D40 and the current detection resistor R10.

The ground-fault detection power supply V20, the current mirror circuit, and the ground-fault detection portion are a circuit that does not activate the converter 10 when a ground fault is occurring at the anode of the LED 100, and can be therefore referred to also as a protection circuit. The present embodiment adopts a case where the protection circuit is provided separately from the control circuit M10. It should be appreciated, however, that the protection circuit together with the control circuit M10 may be made into an IC.

Figure 2:
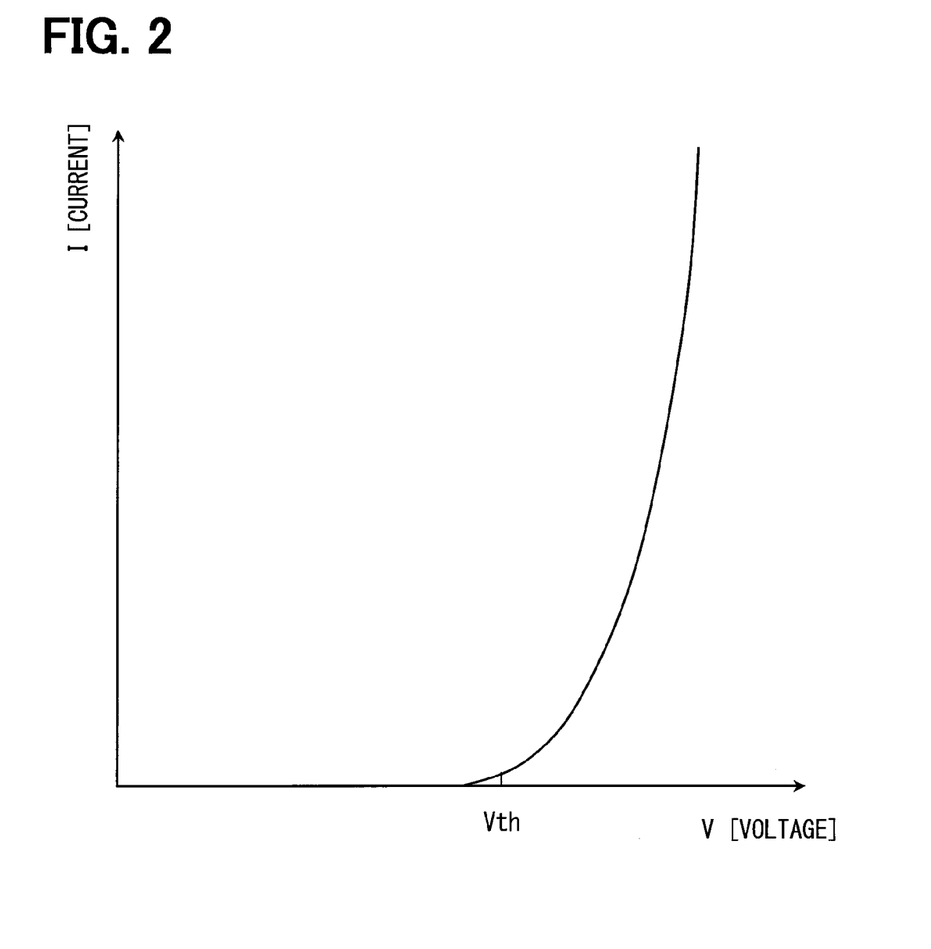
FIG. 2 shows a graph of current-to-voltage characteristics of an LED.

The principle of a ground-fault detection by the LED drive device will now be described. The LED drive device performs a ground-fault detection on the basis of the I-V characteristics of the LED 100 shown in FIG. 2. As is shown in FIG. 2, a current flows little unless a voltage as high as or higher than the threshold voltage Vth is applied to the LED 100. As has been described, a voltage of the ground-fault detection power supply V20 from which a current is passed through the output smoothing capacitor C11 is set to be less than the threshold voltage Vth of the LED 100. In short, a power supply of a voltage less than the threshold voltage Vth of the LED 100 is adopted as the ground-fault detection power supply V20.

Owing to the configuration as above, when a ground fault is not occurring at the anode of the LED 100 (normal state), the LED drive device is capable of charging the output smoothing capacitor C11 by passing a current through the output smoothing capacitor C11 while preventing a current from flowing from the current mirror circuit to the LED 100. Further, when the charging of the output smoothing capacitor C11 is completed, the LED drive device is capable of preventing a current from flowing from the current mirror circuit.

While the converter 10 is in operation, the anode voltage of the LED 100 becomes higher than a voltage of the ground-fault detection power supply V20 because a voltage as high as or higher than the threshold voltage Vth of the LED 100 is applied. Hence, a current does not flow from the current mirror circuit as long as the converter 10 is operating.

On the other hand, in the event of a ground fault at the anode of the LED 100, a current charging the output smoothing capacitor C11 flows to a ground-fault point. An increase of potential due to a ground-fault current flowing to the ground-fault point is at a value far smaller than a voltage of the ground-fault detection power supply V20. Hence, a current keeps flowing from the current mirror circuit as long as a ground-fault is occurring at the anode of the LED 100. The LED drive device detects a ground fault on the basis of the mechanism as above.

An operation relating to a ground-fault detection by the LED drive device will now be described. Firstly, an operation in the normal state will be described. The LED drive device allows a current to flow from the current mirror circuit before the converter 10 is activated. The current mirror circuit charges the output smoothing capacitor C11 via the diode D30 by supplying a current. At the same time, the current mirror circuit passes a current from the resistor R41 to the diode D40 and the current detection resistor R10 when a current supplied from the current mirror is flowing by flowing through the diode D30. Further, the current mirror circuit passes a current by way of the transistor T40, the resistor R40, and the diode D30 when a current supplied from the current mirror is flowing by flowing through the diode D30.

Herein, the transistor T40 switches ON. Consequently, the voltage-dividing resistors that determine a voltage (threshold voltage) at the inverting input terminal change from the resistor R43 and the resistor R44 to the resistor R42//the resistor R43 (combined resistor of the resistor R42 and the resistor R43 connected in parallel) and the resistor R44. In short, a voltage at the inverting input terminal is at a value determined by a resistance ratio of the resistor R43//the resistor R43 and the resistor R44. In the manner as described above, when a current is flowing from the current mirror circuit, the voltage setting circuit selects the resistors R42 through R44 in such a manner that a voltage at the inverting input terminal becomes higher than an anode voltage of the diode D40. The anode voltage of the diode D40 is a voltage at the anode of the diode D40 by a current flowing through the resistor R41, the diode D40, and the current detection resistor R10.

Hence, the comparator 40 operates when a current is flowing from the current mirror circuit and is therefore capable of setting the enable terminal of the control circuit M10 to the ground potential. In short, the comparator 40 is capable of not activating the converter 10 when a current is flowing from the current mirror circuit. Hence, the LED drive circuit is capable of not activating the converter 10 when a current is flowing from the current mirror circuit.

Potential of the output smoothing capacitor C11 rises when the output smoothing capacitor C11 is charged by the current mirror circuit. Accordingly, a current from the current mirror circuit eventually stops flowing through the diode D30. The transistor T40 therefore switches OFF and a voltage at the inverting input terminal changes to a value determined by a resistance ratio of the resistor R43 and the resistor R44. That is to say, the voltage setting circuit selects the resistors R42 through R44 in such a manner that a voltage at the inverting input terminal becomes lower than the anode voltage of the diode D40.

Consequently, the output stage transistor of the comparator 40 switches OFF when a current stops flowing from the current mirror circuit. Hence, a voltage at the enable terminal of the control circuit M10 is set to HIGH by the lighting enable circuit 100. In the manner as above, the comparator 40 is capable of activating the converter 10 when a current is not flowing from the current mirror circuit. In short, the LED drive device is capable of activating the converter 10 when a current is not flowing from the current mirror circuit.

A reason why the diode 40 is used will now be described. The diode 40 is used in order to configure the LED drive device to be also capable of detecting a ground fault on the cathode side of the LED 10. In the event of a ground fault at the cathode of the LED 10, a current stops flowing through the diode 40 and therefore a voltage at the non-inverting input terminal of the comparator 40 does not rise. The LED drive device is also capable of detecting a ground fault on the cathode side of the LED 10 on the basis of the mechanism as above.

An operation when a ground fault is already present at the anode of the LED 100 before the converter 10 is activated will now be described. Herein, a current supplied from the current mirror circuit flows to the ground-fault point. Hence, the voltage-dividing resistors that determine a voltage (threshold voltage) at the inverting input terminal are the resistor R42//the resistor R43 (combined resistor of the resistor R42 and the resistor R43 connected in parallel) and the resistor R44. The comparator 40 therefore continues to operate and does not switch OFF as described above. The LED drive device is thus capable of continuing a state in which the converter 10 is not activated.

An operation when a ground fault occurs at the anode of the LED 100 while the converter 10 is operating will now be described. Herein, potential at the anode of the LED 100 drops to the ground potential. Hence, a current starts flowing from the current mirror circuit to the ground-fault point. Accordingly, the voltage-dividing resistors that determine a voltage (threshold voltage) at the inverting input terminal change from the resistor R43 and the resistor R44 to the resistor R42//the resistor R43 and the resistor R44. Hence, the comparator 40 operates and is therefore capable of setting the enable terminal of the control circuit M10 to the ground potential as described above. The LED drive device is thus capable of stopping the converter 10 immediately.

As has been described, the comparator 40 assumes that a ground fault is not occurring at the anode of the LED 100 when a voltage at the inverting input terminal is lower than a voltage at the non-inverting input terminal. In other words, it can be said that the comparator 40 detects that a ground fault is not occurring at the anode of the LED 100 when a voltage at the inverting input terminal is lower than a voltage at the non-inverting input terminal. Hence, the comparator 40 is capable of enabling an operation of the converter 10 when a ground fault is not occurring at the anode of the LED.

Also, the comparator 40 assumes that a ground fault is occurring at the anode of the LED 100 when a voltage at the inverting input terminal is higher than a voltage at the non-inverting input terminal. In other words, it can be said that the comparator 40 detects that a ground fault is occurring at the anode of the LED when a voltage at the inverting input terminal is higher than a voltage at the non-inverting input terminal. The comparator 40 is thus capable of stopping an operation of the converter 10 when a ground fault is occurring at the anode of the LED 100.

As has been described, the LED drive device includes the ground-fault detection power supply V20 and the current mirror circuit. Hence, the LED drive device is capable of passing a current to the anode side of the LED 100 even before the converter 10 is activated. When a ground fault is not occurring at the anode of the LED 100, the output smoothing capacitor C11 is charged with a current generated by the current mirror circuit. Accordingly, potential of the output smoothing capacitor C11 rises and a current from the current mirror circuit eventually stops flowing. Hence, the ground-fault detection portion can assume that a ground fault is not occurring at the anode of the LED 100 when a current from the current mirror circuit is not flowing.

On the other hand, in the event of a ground fault at the anode of the LED 100, potential on the anode side of the LED 100 is at the ground potential. Hence, a current from the current mirror circuit flows. Accordingly, the ground-fault detection portion can assume that a ground fault is occurring at the anode of the LED 100 when a current from the current generation portion is flowing. The LED drive device is thus capable of detecting whether a ground fault is occurring at the anode of the LED 100 before the converter is activated. Further, the LED drive device is capable of detecting whether a ground fault is occurring at the anode of the LED 100 even when the converter is operating.

When the ground-fault detection portion assumes that a ground fault is not occurring at the anode of the LED 100, the ground-fault detection portion is capable of setting the enable terminal of the control circuit M10 to HIGH. When the ground-fault detection portion assumes that a ground fault is occurring at the anode of the LED 100, the ground-fault detection portion is capable of setting the enable terminal of the control circuit M10 to the ground potential. In other words, when the ground-fault detection portion assumes that a ground fault is not occurring at the anode of the LED 100, the ground-fault detection portion is capable of changing a signal outputted from the lighting enable circuit 100 to a signal indicating a command to enable an operation of the converter 10. On the other hand, when the ground-fault detection portion assumes that a ground fault is occurring at the anode of the LED 100, the ground-fault detection portion is capable of stopping a signal indicating a command to enable an operation of the converter 10 by setting the enable terminal of the control circuit M10 to the ground potential independently of an output of the lighting enable circuit 100. In other words, it can be said that when the ground-fault detection portion assumes that a ground fault is occurring at the anode of the LED 100, the ground-fault detection portion is capable of changing a signal outputted from the lighting enable circuit 100 to a signal indicating a command to stop an operation. Hence, when a ground fault is not occurring at the anode of the LED 100, the LED drive device is capable of activating the converter 10 and is capable of not activating the converter 10 when a ground fault is occurring at the anode of the LED 100.

In the present embodiment, the converter 10 provided with the output smoothing capacitor C11 is adopted. It should be appreciated, however, that the present disclosure is not limited to the configuration as above, and the object can be achieved as well even when the output smoothing capacitor C11 is not provided.

As has been described, the LED drive circuit includes the ground-fault detection power supply V20 and the current mirror circuit, and is therefore capable of passing a current to the anode side of the LED 100 even before the converter 10 is activated. Nevertheless, a current from the current mirror circuit does not flow when a ground fault is not occurring at the anode of the LED 100 because a voltage of the ground-fault detection power supply V20 is lower than the threshold voltage Vth of the LED 100. Hence, the ground-fault detection portion can assume that a ground fault is not occurring at the anode of the LED 100 when a current from the current mirror circuit is not flowing.

On the other hand, in the event of a ground fault at the anode of the LED 100, potential on the anode side of the LED 100 is the ground potential. A current from the current mirror circuit therefore keeps flowing. Hence, the ground-fault detection portion can assume that a ground fault is occurring at the anode of the LED 100 when a current from the current mirror circuit is flowing. In the manner as above, even when the output smoothing capacitor C11 is not provided, the LED drive device achieves an advantageous effect same as the advantageous effect achieved when the output smoothing capacitor C11 is provided.

Further, by using the current mirror circuit, the LED drive device becomes capable of restricting an inconvenience that the converter 10 stops operating due to an inverse leak current at a high temperature even when a Schottky-barrier diode is adopted as the second rectifier diode D11.

In the event of a ground fault at the anode of the LED, a DC-to-DC converter provided with the current detection resistor on the low side operates at a maximum output because a feedback voltage generated by the current detection resistor drops to 0. Hence, the converter 10 may possibly be overloaded. However, the LED drive device is capable of detecting a ground fault before the converter 10 is activated. Hence, even when the current detection resistor R10 is provided on the low side, the LED drive device is capable of restricting an inconvenience that the converter 10 is overloaded when a ground fault is occurring at the anode of the LED 100.

While the preferred embodiment of the present disclosure has been described, it should be appreciated that the present disclosure is not limited to the embodiment above and can be modified in various manners within the scope of the present disclosure.

First through sixth modifications of the LED drive device will be described below. The first through sixth modifications are also feasible when combined suitably.

First Modification

Figure 3:
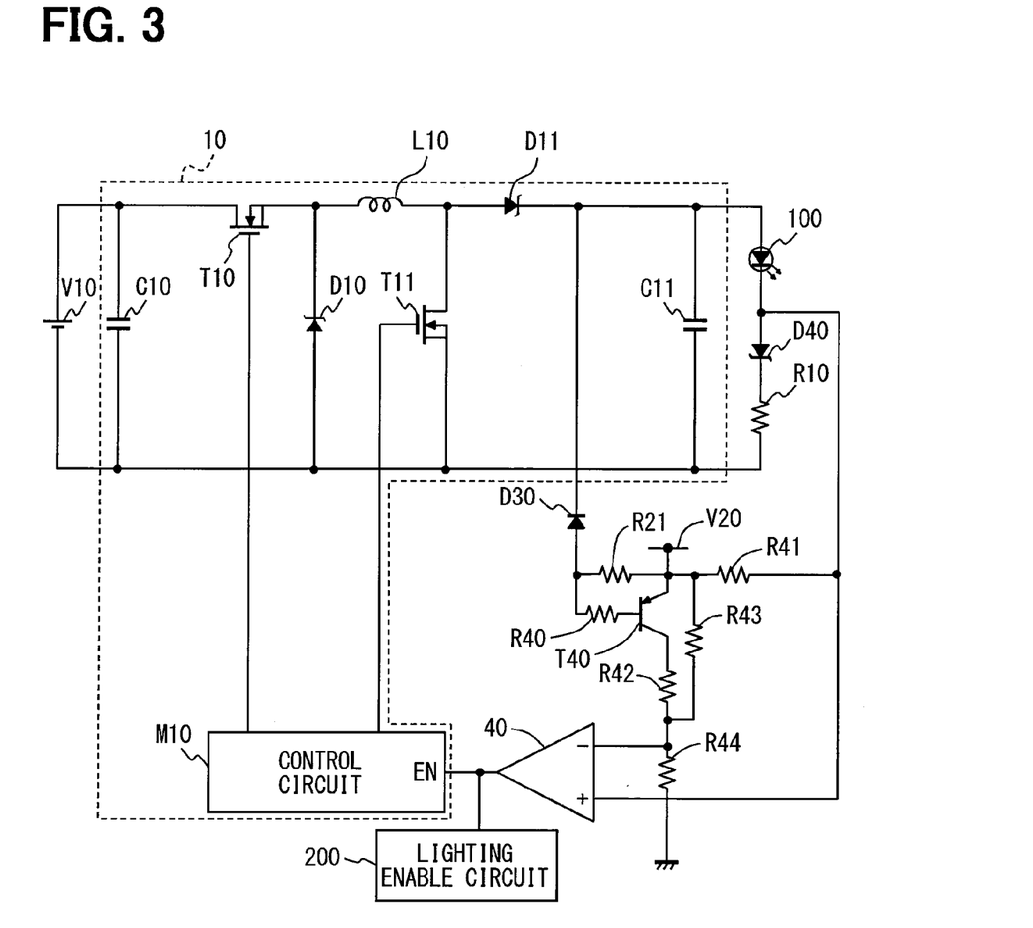
FIG. 3 is a circuit diagram schematically showing a configuration of an LED drive device according to a first modification.

The present disclosure may be modified as in a first modification shown in FIG. 3 so as to include a resistor R21 as the current generation portion instead of the current mirror circuit. That is to say, an LED drive device of the first modification includes the resistor R21 and omits the first transistor T20, the second transistor T21, and the resistor R20 used in the embodiment above. Accordingly, the LED drive device of the first modification is configured in such a manner that a current with which to charge an output smoothing capacitor C11 is determined by the resistor R21.

The LED drive device of the first modification is different from the LED drive device of the embodiment above in the configuration specified above. The LED drive device of the first modification and the LED drive device of the embodiment above are the same in the rest. Hence, components forming the LED drive device of the first modification are labeled with same reference numerals labeled to the counterparts forming the LED drive device of the embodiment above and a description is omitted herein.

The LED drive device of the first modification is capable of achieving advantageous effects same as the advantageous effects of the LED drive device of the embodiment above. Further, a physical size of the LED drive device of the first modification can be smaller than a physical size of the LED drive device of the embodiment above because the first transistor T20, the second transistor T21, and the resistor R20 forming the current mirror circuit are omitted. That is to say, more space can be saved by the LED drive device of the first modification than by the LED drive device of the embodiment above. In addition, the LED drive device of the first modification is expected to reduce the cost further in comparison with the LED drive device of the embodiment above.

The LED drive device of the first modification is suitable when a MOSFET or a typical diode is adopted as the second rectifier diode D11. In other words, the LED drive device of the first modification is suitable when no consideration is necessary for a reverse leak current at a high temperature in the second rectifier diode D11. The typical diode referred to herein means a diode that does not use a Schottky barrier occurring when metal and a semiconductor are joined.

Second Modification

Figure 4:
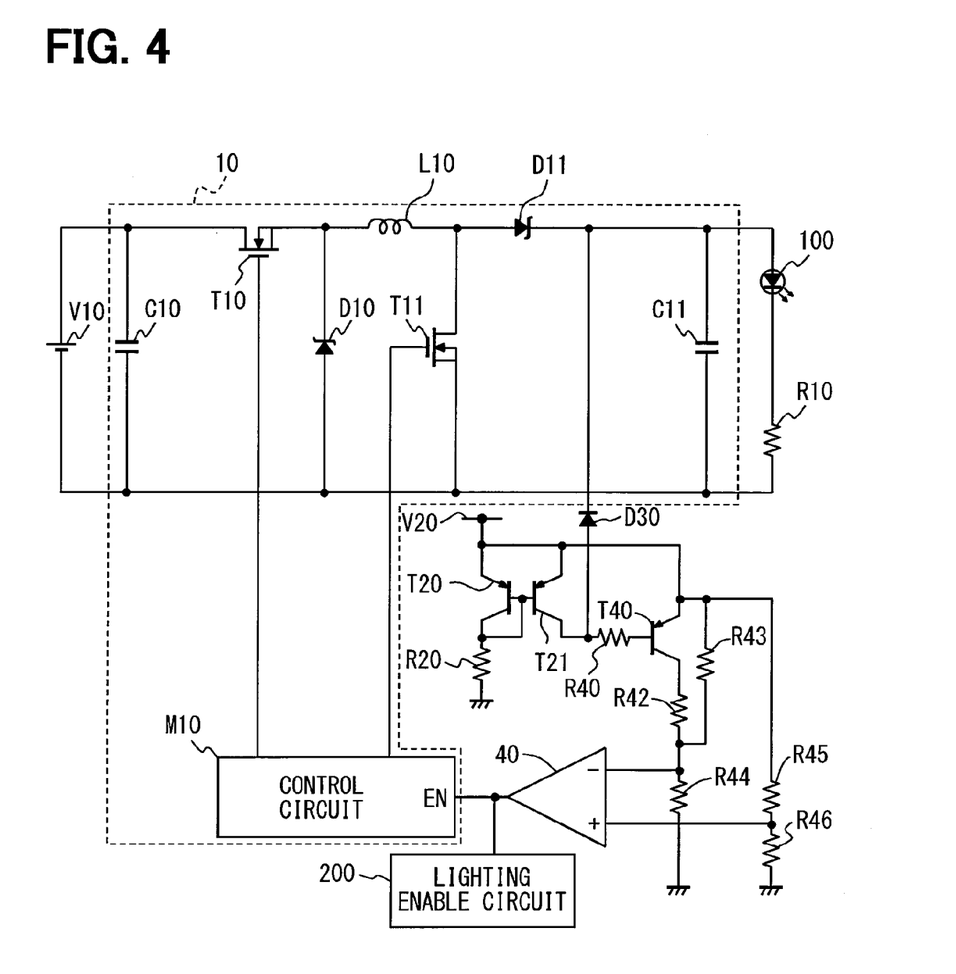
FIG. 4 is a circuit diagram schematically showing a configuration of an LED drive device according to a second modification.

The present disclosure may be modified as in a second modification shown in FIG. 4 so as to include a resistor R45 and a resistor R46 instead of the diode D40. That is to say, an LED drive device of the second modification includes the resistor R45 and the resistor R46 and omits the diode D40 used in the embodiment above. Accordingly, the LED drive device of the second modification is configured in such a manner that a voltage at a non-inverting input terminal is determined by a voltage-dividing ratio of the resistor R45 and the resistor R46.

The LED drive device of the second modification is different from the LED drive device of the embodiment above in the configuration specified above. The LED drive device of the second modification and the LED drive device of the embodiment above are the same in the rest. Hence, components forming the LED drive device of the second modification are labeled with same reference numerals labeled to the counterparts forming the LED drive device of the embodiment above and a description is omitted herein.

The LED drive device of the second modification is capable of achieving advantageous effects same as the advantageous effects of the LED drive device of the embodiment above. Further, the LED drive device of the second modification is more preferable than the LED drive device of the embodiment above because the diode D40 is omitted and hence no loss occurs.

Third Modification

Figure 5:
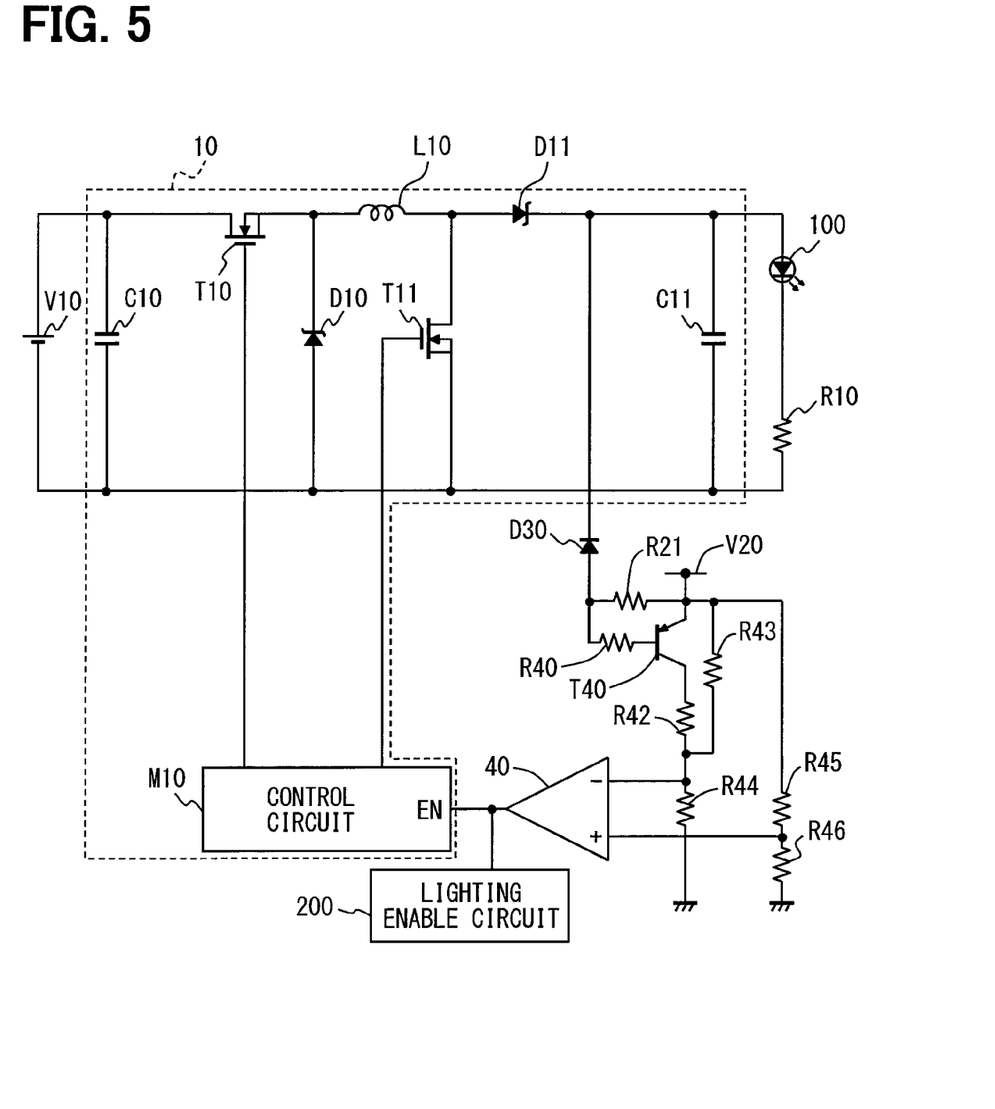
FIG. 5 is a circuit diagram schematically showing a configuration of an LED drive device according to a third modification.

The present disclosure may be modified as in a third modification shown in FIG. 5 so as to include a resistor R21 instead of the current mirror circuit and a resistor R45 and a resistor R46 instead of the diode D40. That is to say, an LED drive device of the third modification is the LED drive device of the first modification above configured to include the resistor R45 and the resistor R46 as in the LED drive device of the second modification.

The LED drive device of the third modification is different from the LED drive device of the embodiment above in the configuration specified above. The LED drive device of the third modification and the LED drive device of the embodiment above are the same in the rest. Hence, components forming the LED drive device of the third modification are labeled with same reference numerals labeled to the counterparts forming the LED drive device of the embodiment above and a description is omitted herein. The LED drive device of the third modification is capable of achieving advantageous effects same as the advantageous effects of the LED drive device of the embodiment above, the LED drive device of the first modification above, and the LED drive device of the second modification above.

Fourth Modification

Figure 6:
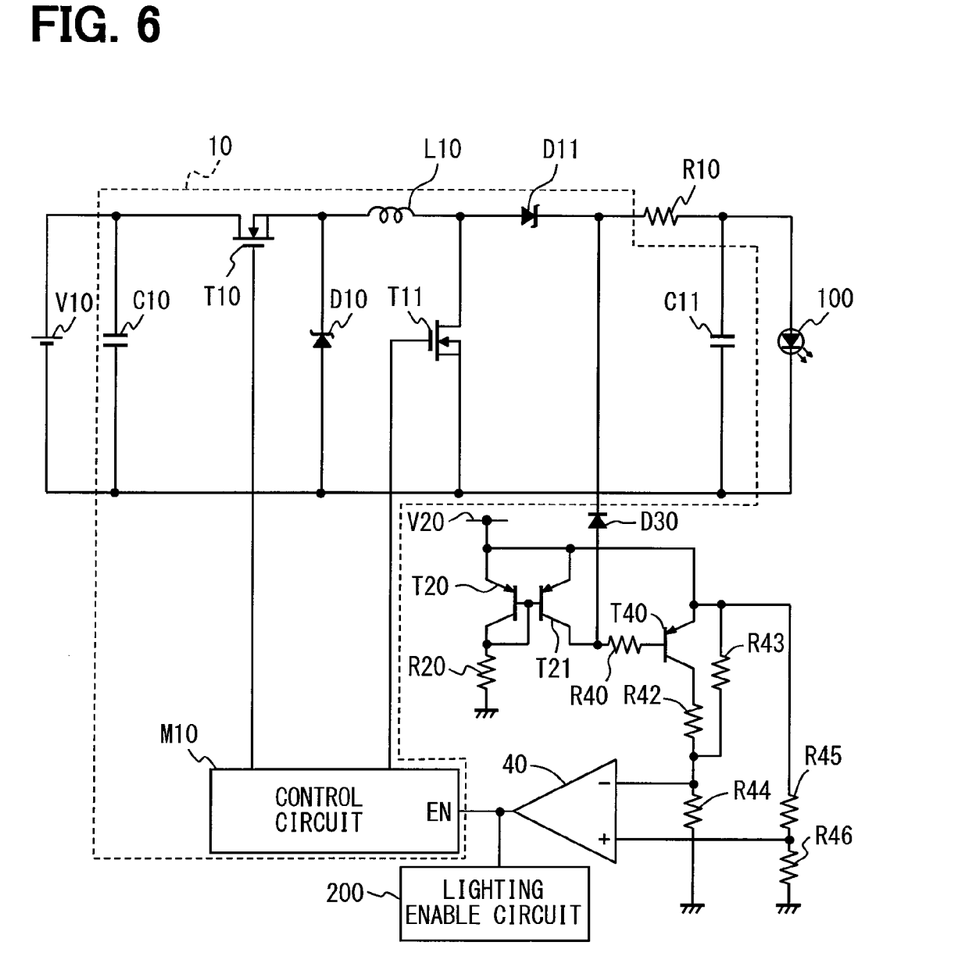
FIG. 6 is a circuit diagram schematically showing a configuration of an LED drive device according to a fourth modification.

The present disclosure may be modified as in a fourth modification shown in FIG. 6 so as to provide the current detection resistor R10 used in the LED drive device of the second modification above on a high side. The LED drive device of the fourth modification is different from the LED drive device of the second modification above in the configuration specified above. The LED drive device of the fourth modification and the LED drive device of the second modification above are the same in the rest. Hence, components forming the LED drive device of the fourth modification are labeled with same reference numerals labeled to the counterparts forming the LED drive device of the second modification above and a description is omitted herein.

The LED drive device of the fourth modification is capable of achieving advantageous effects same as the advantageous effects of the LED drive device of the second modification above. Further, the LED drive device of the fourth modification is capable of performing a constant current control in the event of a ground fault at an anode of an LED 100 because the current detection resistor R10 is provided on the high side. The LED drive device of the fourth modification is capable of restricting an inconvenience that a converter 10 operates at a maximum output in the event of a ground fault at the anode of the LED 100 as with the LED drive device of the second modification above. In term of the inconvenience restricting capability as above, the LED drive device of the fourth modification outperforms the LED drive device of the second modification above. In addition, owing to the capability of detecting a ground fault before the converter 10 is activated, the LED drive device of the fourth modification is capable of restricting an inconvenience that a rated current is passed to a ground fault point in the event of a ground fault at the anode of the LED 100.

Fifth Modification

Figure 7:
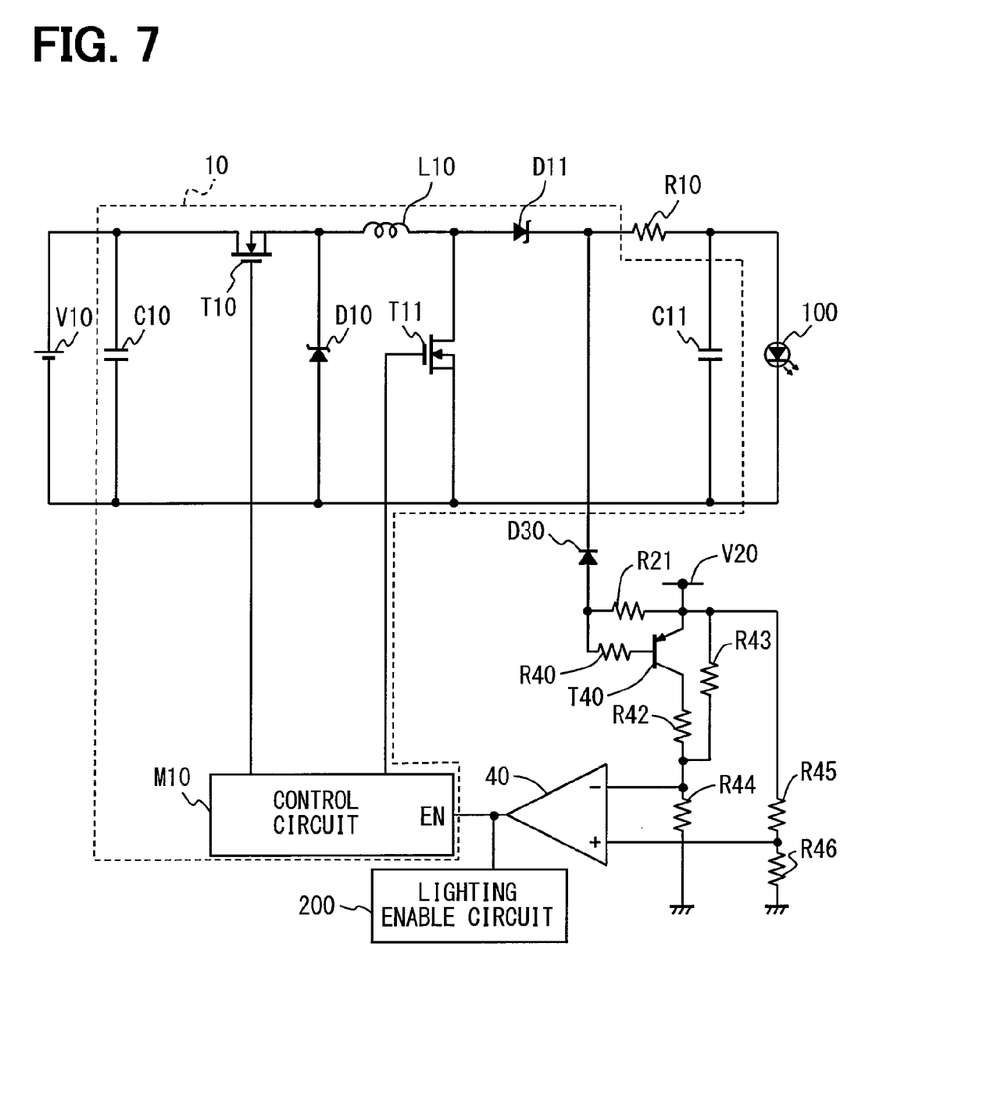
FIG. 7 is a circuit diagram schematically showing a configuration of an LED drive device according to a fifth modification.

The present disclosure may be modified as in a fifth modification shown in FIG. 7 so as to provide the current detection resistor R10 used in the LED drive device of the third modification above on a high side. The LED drive device of the fifth modification is different from the LED drive device of the third modification above in the configuration specified above. The LED drive device of the fifth modification and the LED drive device of the third modification above are the same in the rest. Hence, components forming the LED drive device of the fifth modification are labeled with same reference numerals labeled to the counterparts forming the LED drive device of the third modification above and a description is omitted herein.

The LED drive device of the fifth modification is capable of achieving advantageous effects same as the advantageous effects of the LED drive device of the third modification above. Further, the LED drive device of the fifth modification is capable of achieving advantageous effects same as the advantageous effects of the LED drive device of the fourth modification above.

Sixth Modification

Figure 8:
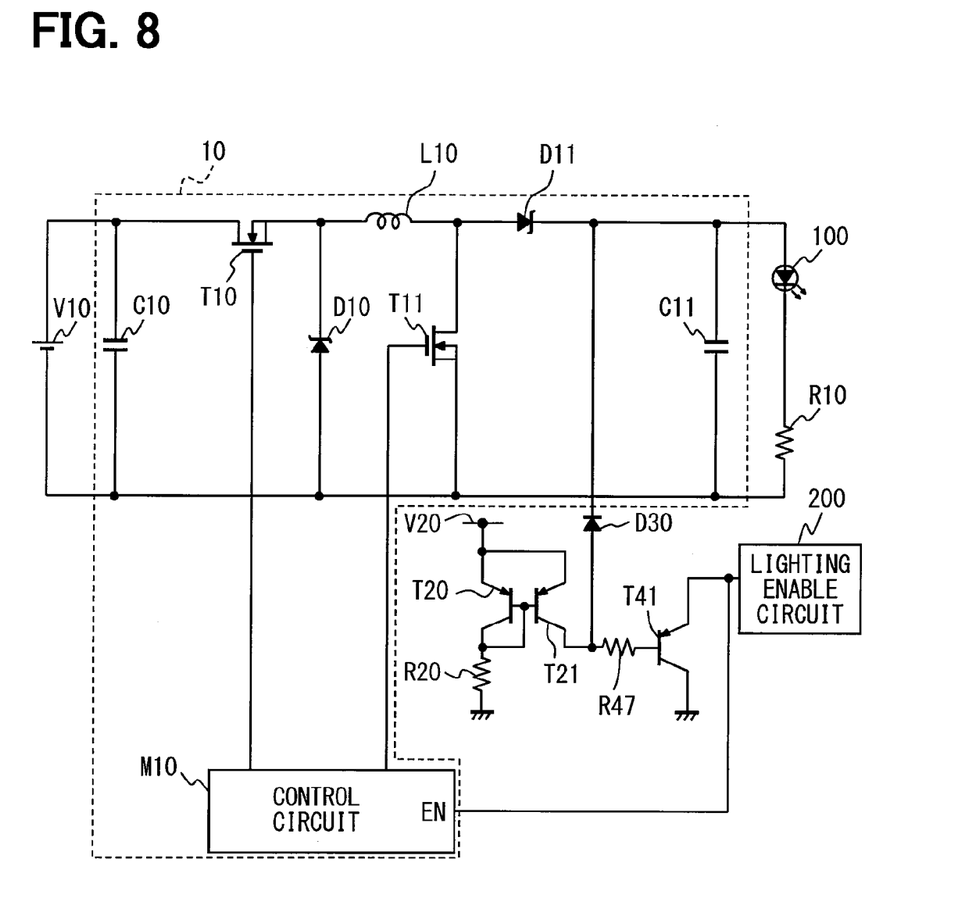
FIG. 8 is a circuit diagram schematically showing a configuration of an LED drive device according to a sixth modification.

The present disclosure may be modified as in a sixth modification shown in FIG. 8 so as to include a transistor T41 instead of the comparator 40. That is to say, an LED drive device of the sixth modification includes the transistor T41 and omits the comparator 40, the resistors R41 through R44, and the diode D40 used in the embodiment above. A resistor R47 of FIG. 8 is furnished with a function same as the function of the resistor R40 of FIG. 1 and serves as a resistor to set a base current with which the transistor T41 switches ON. The LED drive device of the sixth modification is configured in such a manner that the transistor T41 enables an operation of a converter 10 and stops an operation of the converter 10. In other words, the LED drive device of the sixth embodiment adopts the transistor T41 as a ground-fault detection portion.

The LED drive device of the sixth modification is different from the LED drive device of the embodiment above in the configuration specified above. The LED drive device of the sixth modification and the LED drive device of the embodiment above are the same in the rest. Hence, components forming the LED drive device of the sixth modification are labeled with same reference numerals labeled to the counterparts forming the LED drive device of the embodiment above and a description is omitted herein.

The transistor T41 corresponds to a switching element. The transistor T41 enables an operation of the converter 10 by switching OFF when a current from a current mirror current generation portion is not flowing. That is to say, the transistor T41 sets an enable terminal of a control circuit M10 to HIGH when a current from the current mirror current generation portion is not flowing. In the present modification, a lighting enable circuit 200 is connected between an emitter of the transistor T41 and the control circuit M10. Hence, the LED drive device of the sixth modification changes an output of the light enable circuit 200 to a signal indicating a command to enable an operation of the converter 10 when a current from the current mirror current generation portion is not flowing because the transistor T41 switches OFF.

The transistor T41 also stops an operation of the converter 10 by switching ON when a current from the current mirror current generation portion is flowing. That is to say, the transistor T41 sets the enable terminal of the control circuit M10 to ground potential when a current from the current mirror current generation portion is flowing independently of an output of the light enable circuit 100.

The LED drive circuit of the sixth modification is also feasible when suitably combined with the first through fifth modifications above. For example, the LED drive circuit of the sixth modification may be configured so as to pass a current using the resistor R21 instead of the current mirror circuit. Further, the LED drive circuit of the sixth modification may be provided with the current detection resistor R10 on the high side. The LED drive circuit of the sixth modification becomes capable of achieving advantageous effects same as the advantageous effects of the first through fifth modifications above when suitably combined with the first through fifth modifications above. It goes without saying that the LED drive device of the sixth modification is capable of achieving advantageous effects same as the advantageous effects of the LED drive device of the embodiment above.

The disclosure described above includes aspects as follows.

An LED drive device according to an aspect of the present disclosure drives lighting of an LED connected to a power-supply line at an anode and connected to ground at a cathode. The LED drive device includes: a power conversion device configured to supply the LED with a voltage of a first power supply after voltage conversion; a second power supply of a voltage lower than a threshold voltage at which a current starts flowing through the LED; a current generation portion configured to generate a current using the voltage of the second power supply and capable of supplying the generated current to an anode side of the LED; and a ground-fault detection portion configured to determine that a ground fault is not occurring at the anode of the LED when a current from the current generation portion is not flowing and determine that a ground fault is occurring at the anode of the LED when a current from the current generation portion is flowing.

The LED drive device includes the second power supply and the current generation portion. Hence, the LED drive device is capable of passing a current to the anode side of the LED even before the power conversion device is activated. Nevertheless, in a case where a ground fault is not occurring at the anode of the LED, a current from the current generation portion does not flow because the voltage of the second power supply is lower than threshold voltage of the LED. Hence, the ground-fault detection portion can assume that a ground fault is not occurring at the anode of the LED when a current from the current generation portion is not flowing. On the other hand, in the event of a ground fault at the anode of the LED, potential on the anode side of the LED is the ground potential (GND). Accordingly, a current from the current generation portion flows to a ground-fault point. Hence, the ground-fault detection portion can assume that a ground fault is occurring at the anode of the LED when a current from the current generation portion is flowing. In the manner as above, the LED drive device is capable of detecting whether a ground fault is occurring at the anode of the LED even before the power conversion device is activated.

The power conversion device is often provided with a smoothing capacitor on an output side. Hence, it may alternatively be configured in such a manner that the power conversion device includes a smoothing capacitor on the output side, which is provided in parallel with the LED. The current generation portion is capable of charging the smoothing capacitor by passing the generated current through the smoothing capacitor. When configured as above, the smoothing capacitor is charged with a current generated by the current generation portion when a ground fault is not occurring at the anode of the LED. Accordingly, potential of the smoothing capacitor rises and a current from the current generation portion eventually stops flowing. Hence, the ground-fault detection portion can assume that a ground fault is not occurring at the anode of the LED when a current from the current generation portion is not flowing.

Alternatively, it may be configured in such a manner that the ground-fault detection portion enables an operation of the power conversion device upon determination that a ground fault is not occurring at the anode of the LED and stops an operation of the power conversion device upon determination that a ground fault is occurring at the anode of the LED. When configured as above, the ground-fault detection portion is capable of activating the power conversion device when a ground fault is not occurring at the anode of the LED and capable of not activating the power conversion device when a ground fault is occurring at the anode of the LED. That is to say, when a ground fault is already present at the anode of the LED before the power conversion device is activated, the power conversion device can be prevented from being activated. Further, when a ground fault occurs at the anode of the LED when the power conversion device is operating, an operation of the power conversion device can be stopped.

Alternatively, the ground-fault detection portion may include a comparator (40) that enables an operation of the power conversion device when a voltage at an inverting input terminal is lower than a voltage at a non-inverting input terminal, and stops an operation of the power conversion device when a voltage at the inverting input terminal is higher than a voltage at the non-inverting input terminal, and a voltage setting circuit (T40 and R42 through R44) that sets the voltage at the inverting input terminal of the comparator. The voltage setting circuit sets the voltage at the inverting input terminal of the comparator in such a manner that the voltage at the inverting input terminal becomes lower than a voltage at the non-inverting input terminal when a current from the current generation portion is not flowing, and sets the voltage at the inverting input terminal of the comparator in such a manner that the voltage at the inverting input terminal becomes higher than a voltage at the non-inverting input terminal when a current from the current generation portion is flowing.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An LED drive device that drives and lights on an LED having an anode connected to a power-supply line and a cathode connected to a ground, the LED drive device comprising:
   a power conversion device that converts a voltage of a first power supply (V10), and supplies the voltage to the LED;
   a second power supply having a voltage lower than a threshold voltage, at which current starts flowing through the LED;
   a current generation unit that generates current using the voltage of the second power supply, and supplies generated current to an anode of the LED; and
   a ground-fault detection unit that determines that a ground fault does not occur at the anode of the LED when current does not flow from the current generation unit, and determines that the ground fault occurs at the anode of the LED when current flows from the current generation unit.

2. The LED drive device according to claim 1, wherein:
   the power conversion device includes a smoothing capacitor on an output side of the power conversion device, and the smoothing capacitor is arranged in parallel with the LED; and
   the current generation unit charges the smoothing capacitor by passing the generated current through the smoothing capacitor.

3. The LED drive device according to claim 1, wherein:
the ground-fault detection unit enables an operation of the power conversion device when the ground-fault detection unit determines that the ground fault does not occur at the anode of the LED, and stops the operation of the power conversion device when the ground-fault detection unit determines that the ground fault occurs at the anode of the LED.

4. The LED drive device according to claim 3, wherein:
the ground-fault detection unit includes:
- a comparator that enables the operation of the power conversion device when a voltage at an inverting input terminal is lower than a voltage at a non-inverting input terminal, and stops the operation of the power conversion device when the voltage at the inverting input terminal is higher than the voltage at the non-inverting input terminal; and
- a voltage setting circuit that sets the voltage at the inverting input terminal of the comparator; and the voltage setting circuit sets the voltage at the inverting input terminal of the comparator to be lower than the voltage at the non-inverting input terminal when the current does not flow from the current generation unit, and sets the voltage at the inverting input terminal of the comparator to be higher than the voltage at the non-inverting input terminal when the current flows from the current generation unit.

5. The LED drive device according to claim 3, wherein:
the ground-fault detection unit includes a switching element that enables the operation of the power conversion device by switching off when the current does not flow from the current generation unit, and stops the operation of the power conversion device by switching on when the current flows from the current generation unit.

6. The LED drive device according to claim 1, wherein:
the current generation unit is provided by a current mirror circuit.

7. The LED drive device according to claim 1, wherein:
the current generation unit is provided by a resistor.

8. The LED drive device according to claim 1, further comprising:
a resistor that is arranged on a high side of the LED, and detects the current flowing through the LED.

9. The LED drive device according to claim 1, further comprising:
a resistor that is arranged on a low side of the LED, and detects the current flowing through the LED.

* * * * *